(12) United States Patent
Kremer et al.

(10) Patent No.: US 7,469,575 B2
(45) Date of Patent: Dec. 30, 2008

(54) SENSING ROTATION OF AN ENGINE COMPONENT RELATIVE TO AN ENGINE BODY USING A STARTER RING

(75) Inventors: Ken Kremer, Montoursville, PA (US); Forrest Lysinger, Harrisburg, PA (US); Jason Rogers, Newton, KS (US)

(73) Assignee: Lycoming Engines, a division of Avco Corporation, Williamsport, PA (US)

( * ) Notice: Subject to any disclaimer, the term of this patent is extended or adjusted under 35 U.S.C. 154(b) by 42 days.

(21) Appl. No.: 11/590,533

(22) Filed: Oct. 31, 2006

(65) Prior Publication Data

US 2008/0148833 A1 Jun. 26, 2008

(51) Int. Cl.
*G01M 15/00* (2006.01)
(52) U.S. Cl. .................................. 73/114.26
(58) Field of Classification Search .............. 73/114.03, 73/114.04, 114.05, 114.24, 114.25, 114.26, 73/114.27, 114.28
See application file for complete search history.

(56) References Cited

U.S. PATENT DOCUMENTS

| | | | |
|---|---|---|---|
| 3,861,828 A | | 1/1975 | Biermann et al. |
| 5,041,980 A | * | 8/1991 | Maddock et al. ............ 701/101 |
| 6,111,404 A | | 8/2000 | Tashiro et al. |
| 6,176,123 B1 | * | 1/2001 | Sato .......................... 73/117.3 |
| 6,490,914 B1 | * | 12/2002 | Brandenburg et al. ...... 73/117.3 |
| 6,494,086 B1 | * | 12/2002 | Ponti ............................. 73/116 |
| 6,732,029 B2 | * | 5/2004 | Donahue et al. ............... 701/33 |
| 7,021,127 B2 | * | 4/2006 | Schroeder et al. ............. 73/116 |
| 2007/0163336 A1 | * | 7/2007 | Pirone ....................... 73/117.3 |
| 2007/0220960 A1 | * | 9/2007 | JaVaherian ................. 73/117.2 |

FOREIGN PATENT DOCUMENTS

EP 1659281 A1 5/2006

* cited by examiner

*Primary Examiner*—Eric S McCall
(74) *Attorney, Agent, or Firm*—BainwoodHuang

(57) ABSTRACT

In one embodiment, a sensing apparatus senses rotation of an engine component (e.g., a crank shaft) relative to an engine body. The sensing apparatus includes a sensor, and a bracket configured to position the sensor in a fixed location relative to the engine body. The starter ring has (i) a support portion configured to rotate in tandem with the engine component, (ii) a starter interface mounted to the support portion, the starter interface being configured to receive drive from a starter motor during operation of the starter motor, and (iii) a trigger portion mounted to the support portion. The trigger portion is configured to provide a series of indicators during rotation of the engine component. The series of indicators (e.g., a series of magnetic field perturbations during rotation of the engine component) is readable by the sensor thus enabling identification of component positioning and speed.

17 Claims, 4 Drawing Sheets

SENSING ROTATION OF AN ENGINE COMPONENT RELATIVE TO AN ENGINE BODY USING A STARTER RING

BACKGROUND

In the context of an aircraft engine, a typical starter ring gear is a metallic circular device having gear teeth fitted around its periphery. To start the aircraft engine, a start motor drives the gear teeth which transfers torque from the starter motor to rotate the engine to begin the cycle.

One conventional aircraft engine design has a starter ring gear disposed at a front end of the engine near a propeller which is driven by the engine. The starter ring gear includes a single pulley which is configured to drive a belt thus providing drive for an accessory such as an alternator.

In this conventional aircraft engine design, a gear reduction assembly resides at a back end of the engine (i.e., the end opposite the front end). The gear reduction assembly turns at a rate that is half of the engine's crank speed. This assembly provides a low resolution output which electronic circuitry uses to determine crank shaft position and current engine speed.

SUMMARY

Unfortunately, there are deficiencies to the above-described conventional aircraft engine design having a gear reduction assembly for determining crank shaft position and current engine speed. For example, the gear reduction assembly is separated from the aircraft engine's starter ring gear and thus provides a separate reliability concern (i.e., a potential point of failure which is separate from the starter ring gear). Additionally, the low resolution output from the gear reduction assembly provides a degree of imprecision to the electronic circuitry's which compromises the circuitry's ability to determine accurate crank shaft position and engine speed. Furthermore, space limitations around the back end of the aircraft engine may limit the ability to position multiple sensors around the gear reduction assembly and thus inhibit the ability to obtain redundant readings of current aircraft engine crank shaft position and engine speed for fault tolerance.

In contrast to the above-identified conventional aircraft engine design which uses a rear-located gear reduction assembly to determine crank shaft position and current engine speed, an enhanced engine design utilizes a starter ring configured to provide a series of indicators during rotation of an engine component (e.g., a crank shaft). The series of indicators (e.g., a pattern of magnetic flux perturbations) is readable by a sensor thus enabling robust and reliable determination of current crank shaft position and engine speed from the starter ring. Such a design allows for location of redundant sensors at a front of the engine for reduced space consumption, greater space flexibility and/or improved engine access. Moreover, when the starter ring is configured to rotate at the same rate as the crank shaft (e.g., a one-to-one gear ratio), the starter ring is capable of providing high precision signaling for improved crank shaft position and speed determination.

One embodiment is directed to a sensing apparatus for sensing rotation of an engine component (e.g., a crank shaft) relative to an engine body. The sensing apparatus includes a sensor, and a bracket configured to position the sensor in a fixed location relative to the engine body. The starter ring has (i) a support portion configured to rotate in tandem with the engine component, (ii) a starter interface mounted to the support portion, the starter interface being configured to receive drive from a starter motor during operation of the starter motor, and (iii) a trigger portion mounted to the support portion. The trigger portion is configured to provide a series of indicators during rotation of the engine component. The series of indicators (e.g., a series of magnetic field perturbations during rotation of the engine component) is readable by the sensor thus enabling identification of component positioning and speed.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An enhanced engine design utilizes a starter ring configured to provide a series of indicators during rotation of an engine component (e.g., a crank shaft). The series of indicators is readable by a sensor thus enabling robust and reliable determination of current crank shaft position and engine speed from the starter ring. Such a design allows for location of redundant sensors at a front of the engine for reduced space consumption, greater space flexibility and/or improved engine access. Moreover, when the starter ring is configured to rotate at the same rate as that of the crank shaft, the starter ring is capable of providing high precision signaling for improved crank shaft position and speed determination.

Figure 1:
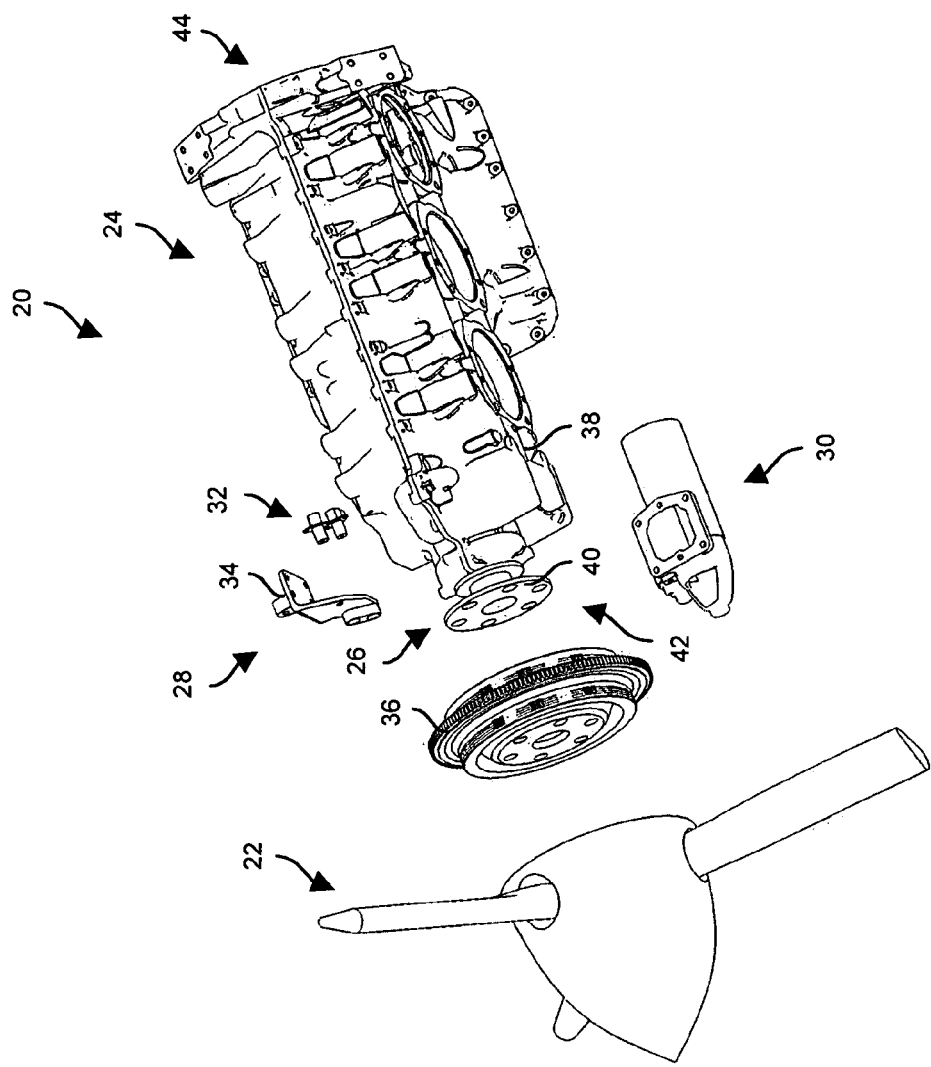
FIG. 1 is a partially exploded view of an engine assembly which utilizes a sensing apparatus having an enhanced starter ring.

FIG. 1 is a partially exploded view of an engine assembly 20 which is configured to drive a load 22 utilizing a sensing apparatus having an enhanced starter ring. The engine assembly 20 includes an engine body 24, an engine component 26 configured to rotate relative to the engine body 24, a sensing apparatus 28 configured to sense rotation of the engine component 26 relative to the engine body 24, and a starter motor 30. The sensing apparatus 28 includes a set of sensors 32 (i.e., one or more sensors 32), a set of brackets 34 (i.e., one or more brackets 34) and a starter ring 36.

The engine body 24 includes, or alternatively is capable of supporting, a variety of engine parts and sections such as a crank case, piston subassemblies, fuel and oil distribution subassemblies, and so on. Only a crank case 38 of the engine body 24 is shown in FIG. 1 for simplicity.

Moreover, the rotatable engine component 26 is illustrated in FIG. 1 a crank shaft 40. In other arrangements, the rotatable engine component 26 is a separate device (e.g., a separate gear or linkage) which rotates in tandem with the crank shaft 40.

Advantageously, the starter ring 34 integrates a variety of operations among which include (i) conveying drive from the starter motor 30 to the crank shaft 40 to initiate the combustion cycle, (ii) driving peripheral devices (e.g., an alternator, fluid pumps, etc.), and (iii) providing a series of indicators which can be used to determine the precise position and speed of the crank shaft 40 (e.g., angular orientation and rotations per minute). Such integration of operations alleviates the need to provide a separate major subassembly for each operation thus reducing the amount of space consumed at a front end 42 defined by the engine assembly 20 between the engine body 24 and the load 22. It should be understood however that, for fault tolerant redundancy, nothing precludes positioning of a separate sensing apparatus at a rear end 44 which is opposite the front end 42, if space exists at the rear end 44.

In connection with identification of crank shaft position and speed, the set of sensors 32 is configured to take readings from the starter ring 34. The set of sensors 32 includes at least two sensors 32 for fault tolerance. In one arrangement, multiple sensors 32 attach to a single bracket 34 which is configured to secure the sensors 32 in a fixed position relative to the engine body 24 (FIG. 1). In another arrangement, the sensors 32 attach to separate brackets 34 which position the sensors 32 at different fixed positions for additional fault tolerance (e.g., at an angular displacement of at least 120 degrees, at substantially 180 degrees, etc.). Such redundancy offers multiple sensing of the start ring 34 in the event that readings from one of the sensors 32 is cut off (e.g., due to damage to that sensor 32 or to an electrical cable leading to that sensor 32).

Due to the above-described space efficiency and sensing fault tolerance offered by the engine assembly 20, it should be understood that the engine assembly 20 is well-suited for aircraft applications (e.g., planes, helicopters, etc.) in which the amount of space at the front and/or rear of the engine may be severely limited. Further details will now be provided with reference to FIGS. 2 through 4.

Figure 2:
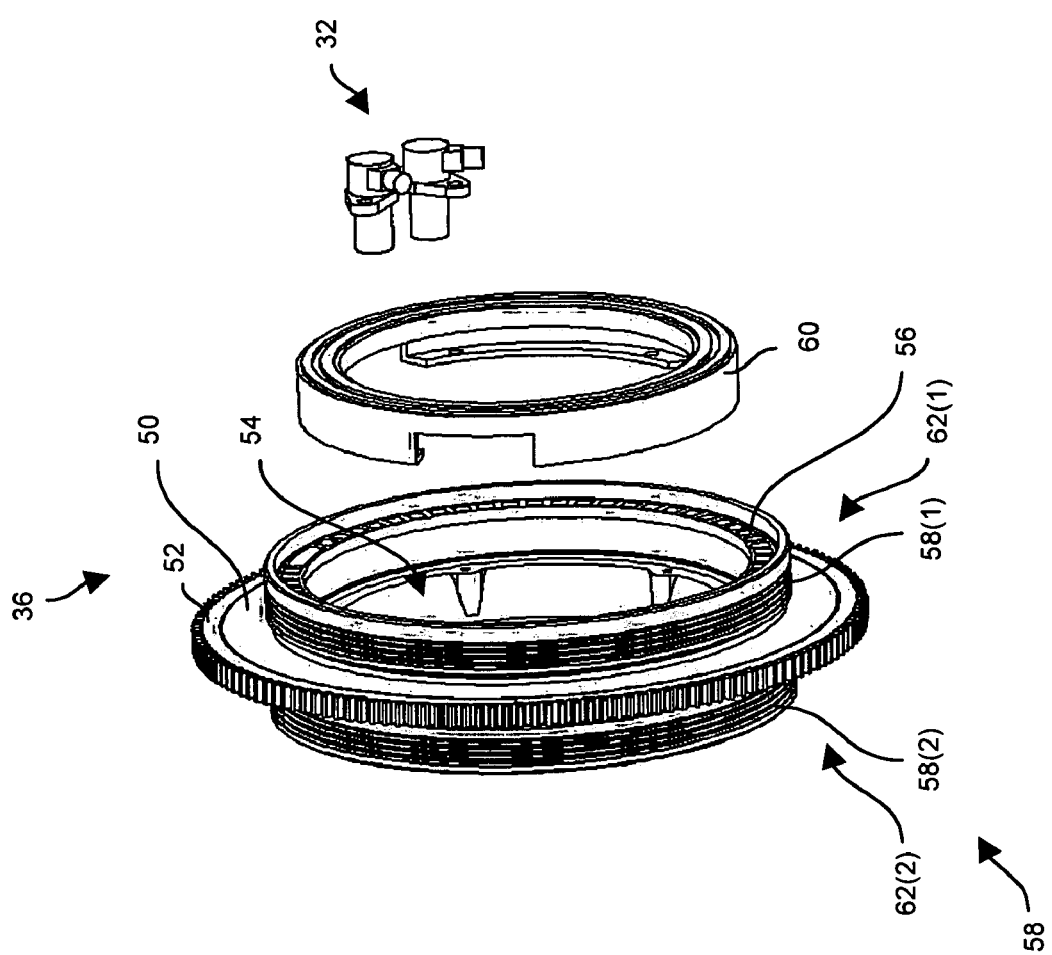
FIG. 2 is a detailed exploded view of various components of the sensing apparatus of FIG. 1.
Figure 3:
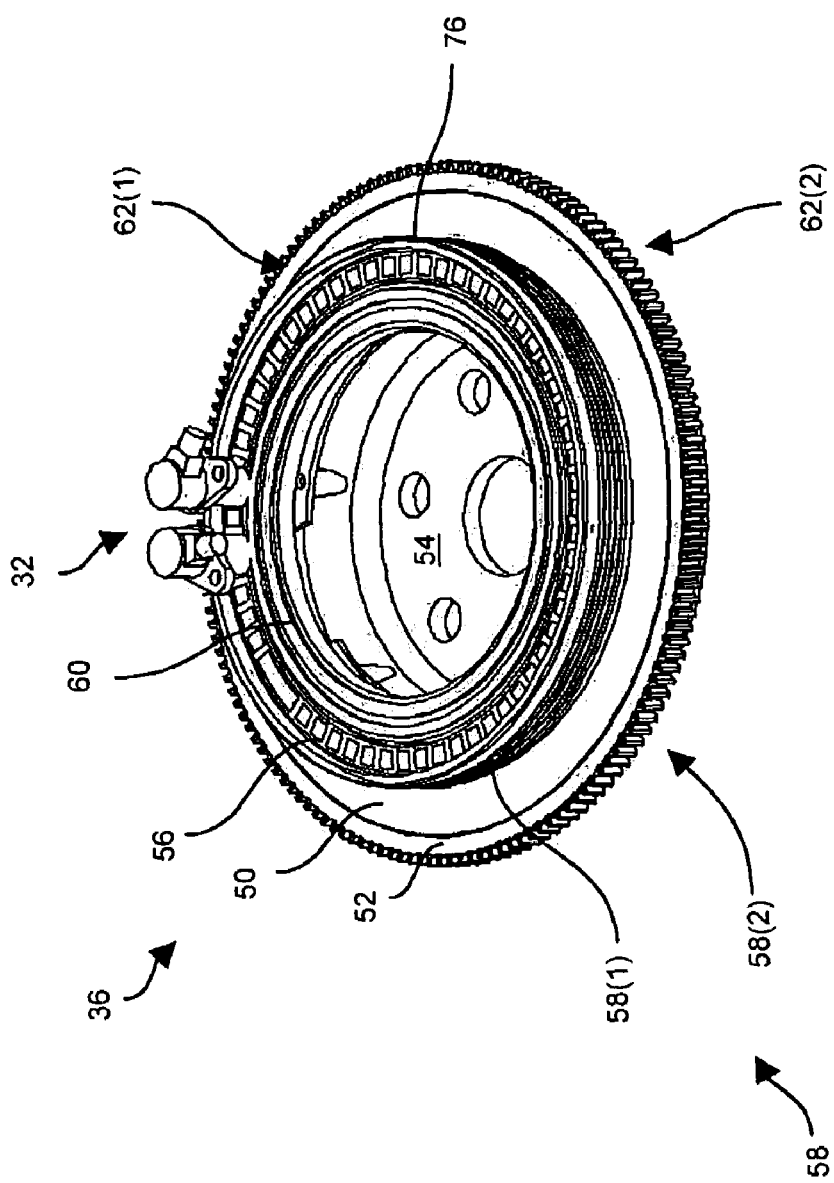
FIG. 3 is a detailed assembled view of the various components of FIG. 2.
Figure 4:
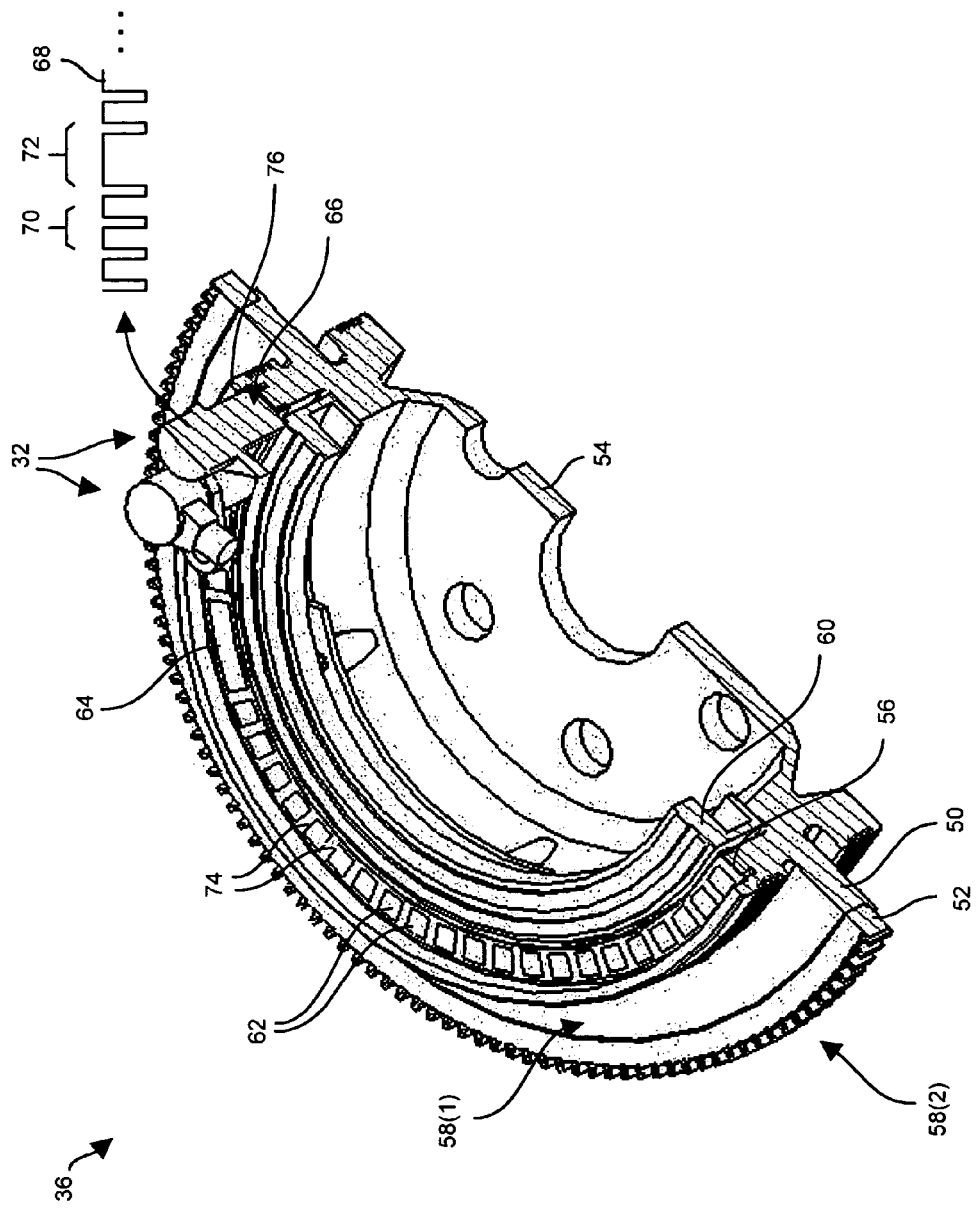
FIG. 4 is a cross-sectional perspective view of the various components of FIG. 3.

FIGS. 2 through 4 show particular details of various components of the sensing apparatus 28. FIG. 2 is a detailed exploded view of the various components. FIG. 3 is an assembled view of the various components. FIG. 4 is a detailed cross-sectional view of the various components.

The starter ring 36 includes a support portion 50, a starter interface 52, a crank shaft interface 54, a trigger portion 56, a first pulley 58(1) and a second pulley 58(2) (collectively, pulleys 58), and a slip ring 60. The first pulley 58(1) is disposed on a first side 62(1) of the support portion 50 which faces the set of sensors 32. The second pulley 58(2) is disposed on a second side 62(2) of the support portion 50 which faces away from the set of sensors 32.

The support portion 50 is configured to rotate in tandem with the engine component 28 (also see FIG. 1), i.e., with a one-to-one gear ratio. The starter interface 52 mounts to the support portion 50 and is configured to receive drive from the starter motor 30 at engine startup time. The crank shaft interface 54 mounts to the support portion 50 and is configured to fasten to the engine component 28 (see FIGS. 3 and 4). The trigger portion 56 mounts to the support portion 50 and is configured to provide a series of indicators during rotation of the engine component 28. The pulleys 58 are configured to provide drive to other peripheral devices (e.g., an alternator, fluid pumps, etc.). The slip ring 60 mounts to the support portion 50 and is configure to provide electrical connectivity between an electrical source and the load 22 (e.g., to provide an electrical surface for electric brushes to wipe against in order to provide electrical power for de-icing an airplane propeller).

The trigger portion 56 includes a series or pattern of trigger teeth 62 and a trigger tab 64 (see FIG. 4). Each sensor 32 is configured to output a sensor signal 64 in response to movement of the trigger teeth 62 and the trigger tab 64 as the trigger teeth 62 and the tab 64 pass by an end 66 of that sensor 32. Accordingly, circuitry (e.g., an electronic engine control module) coupled to the sensors 32 receives, as each sensor signal 68, a series of indicators as the crank shaft 40 rotates the starter ring 36. That is, the sensors 32 output small pulses 70 and an elongated pulse 72 (see FIG. 4) for each rotation of the starter ring 36 and crank shaft 40. Each small pulse 70 corresponds to a pass of one of the trigger teeth 62, and the elongated pulse 72 corresponds to a pass of the trigger tab 64. As a result, the circuitry is capable of determining current position of the crank shaft 40 (e.g., based on the number of small pulses 70 away from the last elongated pulse 72) and the speed of rotation of the crank shaft 40 (e.g., based on the number of elongated pulses 72 detected in a particular period of time).

In some arrangements, the sensors 32 are VR (variable-reluctance) sensors and the trigger teeth 62 are formed of magnetic material (e.g., ferromagnetic material). In these arrangements, interleaved gaps 74 between the trigger teeth 62 are filled with non-magnetic material (e.g., aluminum). Furthermore, the portions of the starter ring 36 other than the trigger teeth 62 are formed of non-magnetic material as well. As such, the trigger portion 56 robustly and reliably provides, as the series of indicators, a series of magnetic field perturbations (e.g., in response to the rate of change in magnetic flux) during rotation of the start ring 36 and the crank shaft 40.

In a particular arrangement, each trigger tooth 62 substantially extends over two (2) degrees of arc (i.e., two degrees wide), and each gap 74 substantially extends over four (4) degrees of arc. In this arrangement, the tab 64 substantially extends over eight (8) degrees of arc (i.e., the tab 64 is formed essentially of two adjacent trigger teeth 62 which are contiguous so that no gap exists between the two). Such an arrangement result in the trigger portion 56 having fifty-eight (58) trigger teeth 62 which provides high precision readings to the sensors 32 for extremely accurate crank shaft position and speed detection.

In some arrangements, the series of trigger teeth 62 and the trigger tab 64 are formed by casting magnetic material (e.g., ferrous metal) within support portion 50 to form a unitary body. Such casting alleviates the need for press-fits or additional fasteners. Non-magnetic material (e.g., steel, aluminum, etc.) is cast to form the gaps 74 as well in order to prevent debris from being captured between adjacent trigger teeth 62. Such fastening techniques prevents the trigger portion 56 from inadvertently moving relative to the support portion 50 during operation as the portions 50, 56 undergo different rates of thermal expansion and stressing.

It should be understood that the pulleys 58 are configured to drive belts to run the peripheral devices and that such belts may break while moving at high speed. To prevent a broken belt from damaging the ends 66 of the sensors 32, the pulley 58(1) defines a shield 76 (e.g., an extension or lip) which recesses the trigger portion 56 and protects the ends 66 of the sensors 32. Accordingly, if a belt does break, the shield 76 guards the sensor ends 66 against physical harm (e.g., an end of broken belt whipping and perhaps destroying a sensor end 66). As a further precaution against damage from a broken belt, the sensors 32 can be positioned in line with the trigger portion 56 but with a large angular separation (e.g., 180 degrees).

As described above, an enhanced engine design utilizes a starter ring 36 configured to provide a series of indicators 70, 72 during rotation of an engine component 26 (e.g., a crank shaft 40). The series of indicators 70, 72 is readable by a sensor 32 thus enabling robust and reliable determination of current crank shaft position and engine speed from the starter ring 36. Such a design allows for positioning of redundant sensors 32 at a front location 42 of the engine body 24 for reduced space consumption, greater space flexibility and/or improved access. Moreover, when the starter ring 36 is configured to rotate at the same rate as that of the crank shaft 40 (i.e., a one-to-one ratio) as described above, the starter ring 36 is capable of providing high resolution for improved crank shaft position and speed determination.

While this invention has been particularly shown and described with references to preferred embodiments thereof, it will be understood by those skilled in the art that various changes in form and details may be made therein without departing from the spirit and scope of the invention as defined by the appended claims.

For example, the sensors 32 where described above as being VR sensors. VR sensors, which detect the rate of change in magnetic field) are well-suited for high temperature applications such as operation in close proximity to an airplane engine. In other arrangements, the sensors 32 are Hall-effect sensors which sense flux magnitude. Hall-effect sensors may be preferable to VR sensors in applications involving lower operating temperatures and/or slower rotational speeds. In yet other arrangements, the sensors 32 are optical sensors and the trigger portion 56 provides an optical pattern which is readable by the optical sensors.

As another example, the trigger tab 64 was described above as being formed of magnetic material by way of example only. In other arrangements, the trigger tab 64 is formed by the absence of magnetic material for an extended distance (e.g., an omitted trigger tooth 62). Such enhancements and modifications are intended to belong to various embodiments of the invention.

What is claimed is:

1. An engine assembly, comprising:
   an engine body;
   an engine component which is configured to rotate relative to the engine body; and
   a sensing apparatus configured to sense rotation of the engine component relative to the engine body, the sensing apparatus including:
     a sensor,
     a bracket configured to position the sensor in a fixed location relative to the engine body, and
     a starter ring having (i) a support portion configured to rotate in tandem with the engine component, (ii) a starter interface mounted to the support portion, the starter interface being configured to receive drive from a starter motor during operation of the starter motor, and (iii) a trigger portion mounted to the support portion, the trigger portion being configured to provide a series of indicators during rotation of the engine component, the series of indicators being readable by the sensor;
   wherein the support portion of the starter ring is formed substantially of non-magnetic material;
   wherein the trigger portion of the starter ring includes a pattern of trigger teeth; and
   wherein each trigger tooth is formed substantially of magnetic material to provide, as the series of indicators, a series of magnetic field perturbations during rotation of the engine component.

2. An engine assembly as in claim 1 wherein the trigger portion of the starter ring is formed by casting the magnetic material within the support portion.

3. An engine assembly as in claim 1 wherein the pattern of trigger teeth is defined by a sequence of trigger teeth interleaved with non-magnetic gaps, each trigger tooth substantially extending over two degrees of arc, and each non-magnetic gap substantially extending over four degrees of arc.

4. An engine assembly as in claim 1 wherein the sensing apparatus further includes:
   another sensor, the bracket being configured to position the sensor and the other sensor in line with the pattern of trigger teeth at the fixed location relative to the engine body.

5. An engine assembly as in claim 1 wherein the pattern of trigger teeth extends substantially around the support portion of the start ring; and wherein the sensing apparatus further includes:
   another sensor, the sensor and the other sensor being separated by at least 120 degrees of arc.

6. An engine assembly as in claim 1 wherein the starter interface which is configured to receive drive from a starter motor during operation of the starter motor, is disposed along an outer periphery of the starter ring; and
   wherein the trigger portion, which is configured to provide the series of indicators during rotation of the engine component, is disposed closer to a center of the starter ring than the starter interface.

7. An engine assembly, comprising:
   an engine body;
   an engine component which is configured to rotate relative to the engine body; and
   a sensing apparatus configured to sense rotation of the engine component relative to the engine body, the sensing apparatus including:
     a sensor,
     a bracket configured to position the sensor in a fixed location relative to the engine body, and
     a starter ring having (i) a support portion configured to rotate in tandem with the engine component, (ii) a starter interface mounted to the support portion, the starter interface being configured to receive drive from a starter motor during operation of the starter motor, and (iii) a trigger portion mounted to the support portion, the trigger portion being configured to provide a series of indicators during rotation of the engine component, the series of indicators being readable by the sensor;
   wherein the engine body defines (i) a front end which is adjacent to a load and (ii) a rear end which is distal to the load;
   wherein the starter ring of the sensing apparatus is disposed proximate to the front end and distal to the rear end;
   wherein the engine body is a crank case;
   wherein the engine component is a crank shaft configured to rotate within the crank case;
   wherein the starter ring of the sensing apparatus further includes a crank shaft interface coupled to the support portion, the crank shaft interface being configured to continuously engage the crank shaft during rotation of the crank shaft; and
   wherein the starter ring of the sensing apparatus further includes:
     a first pulley disposed on a first side of the support portion; and
     a second pulley disposed on a second side of the support portion, the second side being opposite the first side.

8. An engine assembly as in claim 7 wherein the first side of the support portion is configured to face the sensor;
   wherein the second side of the support portion is configured to face away from the sensor; and
   wherein the first pulley defines a shield which is configured to overhang a sensing end of the sensor when the sensor reads the series of indicators provided by the trigger portion of the starter ring during rotation of the crank shaft.

9. A sensing apparatus for sensing rotation of an engine component relative to an engine body, the sensing apparatus comprising:
a sensor;
a bracket configured to position the sensor in a fixed location relative to the engine body; and
a starter ring having (i) a support portion configured to rotate in tandem with the engine component, (ii) a starter interface mounted to the support portion, the starter interface being configured to receive drive from a starter motor during operation of the starter motor, and (iii) a trigger portion mounted to the support portion, the trigger portion being configured to provide a series of indicators during rotation of the engine component, the series of indicators being readable by the sensor;
wherein the support portion of the starter ring is formed substantially of non-magnetic material;
wherein the trigger portion of the starter ring includes a pattern of trigger teeth; and
wherein each trigger tooth is formed substantially of magnetic material to provide, as the series of indicators, a series of magnetic field perturbations during rotation of the engine component.

10. A sensing apparatus as in claim 9 wherein the starter interface which is configured to receive drive from a starter motor during operation of the starter motor, is disposed along an outer periphery of the starter ring; and
wherein the trigger portion, which is configured to provide the series of indicators during rotation of the engine component, is disposed closer to a center of the starter ring than the starter interface.

11. A sensing apparatus for sensing rotation of an engine component relative to an engine body, the sensing apparatus comprising:
a sensor;
a bracket configured to position the sensor in a fixed location relative to the engine body; and
a starter ring having (i) a support portion configured to rotate in tandem with the engine component, (ii) a starter interface mounted to the support portion, the starter interface being configured to receive drive from a starter motor during operation of the starter motor, and (iii) a trigger portion mounted to the support portion, the trigger portion being configured to provide a series of indicators during rotation of the engine component, the series of indicators being readable by the sensor;
wherein the engine component is a crank shaft;
wherein the starter ring further includes a crank shaft interface coupled to the support portion, the crank shaft interface being configured to continuously engage the crank shaft during rotation of the crank shaft; and
wherein the starter ring further includes:
a first pulley disposed on a first side of the support portion; and
a second pulley disposed on a second side of the support portion, the second side being opposite the first side.

12. A sensing apparatus as in claim 11 wherein the first side of the support portion is configured to face the sensor;
wherein the second side of the support portion is configured to face away from the sensor; and
wherein the first pulley defines a shield which is configured to overhang a sensing end of the sensor when the sensor reads the series of indicators provided by the trigger portion of the starter ring during rotation of the crank shaft.

13. A starter ring, comprising:
a support portion configured to rotate in tandem with an engine component when the engine component rotates within an engine body;
a starter interface mounted to the support portion, the starter interface being configured to receive drive from a starter motor during operation of the starter motor; and
a trigger portion mounted to the support portion, the trigger portion being configured to provide a series of indicators during rotation of the engine component, the series of indicators being readable by a sensor which is positioned in a fixed location relative to the engine body;
wherein the support portion is formed substantially of non-magnetic material;
wherein the trigger portion of the starter ring includes a pattern of trigger teeth; and
wherein each trigger tooth is formed substantially of magnetic material to provide, as the series of indicators, a series of magnetic field perturbations during rotation of the engine component.

14. A starter ring as in claim 13 wherein the starter interface which is configured to receive drive from a starter motor during operation of the starter motor, is disposed along an outer periphery of the starter ring; and
wherein the trigger portion, which is configured to provide the series of indicators during rotation of the engine component, is disposed closer to a center of the starter ring than the starter interface.

15. A starter ring, comprising:
a support portion configured to rotate in tandem with an engine component when the engine component rotates within an engine body;
a starter interface mounted to the support portion, the starter interface being configured to receive drive from a starter motor during operation of the starter motor; and
a trigger portion mounted to the support portion, the trigger portion being configured to provide a series of indicators during rotation of the engine component, the series of indicators being readable by a sensor which is positioned in a fixed location relative to the engine body;
wherein the engine component is a crank shaft;
wherein the starter ring further includes a crank shaft interface coupled to the support portion, the crank shaft interface being configured to continuously engage the crank shaft during rotation of the crank shaft; and
wherein the starter ring further includes:
a first pulley disposed on a first side of the support portion; and
a second pulley disposed on a second side of the support portion, the second side being opposite the first side.

16. A starter ring as in claim 15 wherein the first side of the support portion is configured to face the sensor;
wherein the second side of the support portion is configured to face away from the sensor; and
wherein the first pulley defines a shield which is configured to overhang a sensing end of the sensor when the sensor reads the series of indicators provided by the trigger portion during rotation of the crank shaft.

17. An engine assembly, comprising:
an engine body having a front end that is adjacent to a load, and a rear end that is distal to the load;
an engine component which is configured to rotate relative to the engine body; and a sensing apparatus configured to sense rotation of the engine component relative to the engine body, the sensing apparatus including:

a sensor, a bracket configured to position the sensor in a fixed location relative to the engine body, and a ring disposed proximate to the front end of the engine body and distal to the rear end of the engine body, the ring having (i) a support portion configured to rotate in tandem with the engine component, and (ii) a trigger portion mounted to the support portion, the trigger portion being configured to provide a series of indicators during rotation of the engine component, the series of indicators being readable by the sensor;

wherein the engine body is a crank case;

wherein the engine component is a crank shaft configured to rotate within the crank case;

wherein the ring of the sensing apparatus further includes a crank shaft interface coupled to the support portion, the crank shaft interface being configured to continuously engage the crank shaft during rotation of the crank shaft;

wherein the support portion of the ring is formed substantially of non-magnetic material;

wherein the trigger portion of the ring includes a pattern of trigger teeth; and wherein each trigger tooth is formed substantially of magnetic material to provide, as the series of indicators, a series of magnetic field perturbations to the sensor during rotation of the crank shaft within the crank case.

* * * * *